310-13 SR
FIP8502 OR 3,521,092
SEARCH ROOM

DATA STORAGE EXTENDED STROKE ACTUATOR

Filed July 10, 1968

INVENTOR
CLEMENT H. KALTHOFF

BY John H. Holcombe
ATTORNEY

United States Patent Office 3,521,092
Patented July 21, 1970

3,521,092
DATA STORAGE EXTENDED STROKE ACTUATOR
Clement H. Kalthoff, Boulder, Colo., assignor to International Business Machines Corporation, Armonk, N.Y., a corporation of New York
Filed July 10, 1968, Ser. No. 743,709
Int. Cl. H02k *41/02*
U.S. Cl. 310—13 4 Claims

ABSTRACT OF THE DISCLOSURE

An actuator for inserting transducers into and retracting them out of engagement with a recording medium at relatively low speed and for adjusting the lateral position of the transducers so engaged at relatively high speed. The actuator comprises a D.C. linear electric motor having a normal stroke for the high speed adjustment and an extended stroke for the low speed insertion and retraction, and having an emergency eddy current brake to slow retraction. The motor has a cylindrical center pole piece surrounded at one end by an outer pole piece to form a circular flux gap therebetween in which a movable, hollow cylindrical electric drive coil of normal storke is inserted. A hollow, cylindrical coil extension made of a lightweight, non-magnetic material is attached to one end of the coil, between the coil and the transducers. Upon retraction, the coil extension is drawn into the flux gap, displacing the coil which coacts with leakage flux outside the gap. The coil extension is conductive, comprising a shorted turn. Hence, as the coil extension is drawn into the gap, an eddy current is generated therein tending to brake its velocity.

BACKGROUND OF THE INVENTION

Field of the invention

The invention relates to stored-data recording and playback apparatus employing relative movement between a recording medium and a transducer, and more particularly to an actuator for moving the transducer transversely with respect to the direction of relative movement.

DESCRIPTION OF THE PRIOR ART

As data storage systems have developed, each improvement thereto has been directed to optimizing the compromise between increasing the areal density of data, lowering the access time required to find the desired data, and cost reduction. As a result of this development, most data storage devices employ a recording medium comprising a surface having parallel linear strings of data recorded thereon. The linear strings of data are called "tracks." This data is read or played back by means of one or more transducers jointly with means for causing relative movement between the transducer of transducers and the recording medium. This relative movement is generally arranged such that a transducer follows along a corresponding track, recording or reading that track.

Data storage systems employed as part of data processing apparatus require high speed accessing of the various tracks. Two basic philosophies are available. First, a separate transducer may be supplied for each track so that switching between tracks may be done electronically. Second, apparatus may be provided to move a single shared transducer from track to track of the recording medium. The high cost of individual transducers makes the first alternative prohibitive in the majority of applications.

A substantial degree of effort has therefore been applied to the development of shared head files and to the development of high speed actuators for moving the transducers laterally from track to track.

Many shared head files employ replaceable magnetic recording media, such as random access disk files with removable disk packs. In these files it is necessary to retract the transducers out away from the disk pack before the pack may be removed. The actuator employed to accetss the transducers from track to track is also employed to retract the transducers out of the disk pack.

One type of actuator employed in shared head files is a D.C. linear electric motor. Motors of this type comprise a stationary magnet assembly forming a magnetic gap between the magnetic poles in which an electric coil is inserted. An electric current supplied to to coil coacts with the magnetic field to move the coil and thereby move the transducers which are attached to one end of the coil. An example of this type of motor is illustrated and described in copending application Ser. No. 716,968, "Data Storage Accessing Mechanism," L. R. Beach and R. J. Black, filed Mar. 28, 1968, and assigned in common with the present case.

To retract the transducers from the disk pack requires an increase in the length of stroke of the motor. In such motors, the length of stroke is increased by increasing the total length of the coil. However, the efficiency of such motors is directly proportional to the ratio of the width of the flux gap to the total length of the coil. Hence, the longer the stroke of a given motor configuration, the lower the motor efficiency. Since the retraction distance may equal one-third the longest track-to-track accessing stroke, the additional coil length required to effect the retraction greatly reduces the motor's efficiency.

Likewise, such motors generally require a braking mechanism to prevent the coil from crashing when current is supplied the coil to retract, but no reverse current is supplied to stop the coil upon retraction. This can occur if power is lost during a retraction and is called an uncontrolled retraction.

SUMMARY

An object of the present invention is to provide an electric motor actuator having an extended stroke length without substantially impairing the high performance capability of the actuator throughout its normal, shorter stroke.

Briefly, the invention comprises an improvement to extend the stroke of an electric motor having an elongated center pole piece surrounded at one end by an outer pole piece to form a non-magnetic gap therebetween in which a hollow drive coil is inserted. A magnet generates a magnetic field, the lines of flux of which are directed by the poles to extend primarily across the gap with some leakage flux extending outside the gap. The improvement comprises a non-magnetic element attached to one end of the coil and conforming to the gap, thereby allowing movement of the element into the non-magnetic gap and of the coil entirely out of the gap. An electric current through the coil then coacts with the leakage flux to generate a force on the coil tending to move the coil in the direction of the gap. The element includes a shorted turn of electrically conductive material to provide an induced eddy current therein in response to movement of the element into the non-magnetic gap, which eddy current coacts with the primary magnetic flux to generate a force on the non-magnetic element tending to slow the velocity of the coil.

The induced eddy current is proportional to the velocity of the element and therefore provides the advantage of an effective emergency braking means to slow an uncontrolled retraction of the coil.

DESCRIPTION OF THE PREFERRED EMBODIMENT

As discussed above, prior art electric motors lose a substantial degree of efficiency when the stroke is extended to allow withdrawal of the transducers from a removable magnetic recording medium such as a disk pack. Further, an auxiliary emergency braking means is required with such a prior art motor to prevent a crashing of the coil in the event of an uncontrolled retraction.

The invention described herein both provides an extension of the stroke of the motor without substantially impairing the high efficiency accessing from track to track and provides a braking means to slow an uncontrolled retraction.

Figure 1:
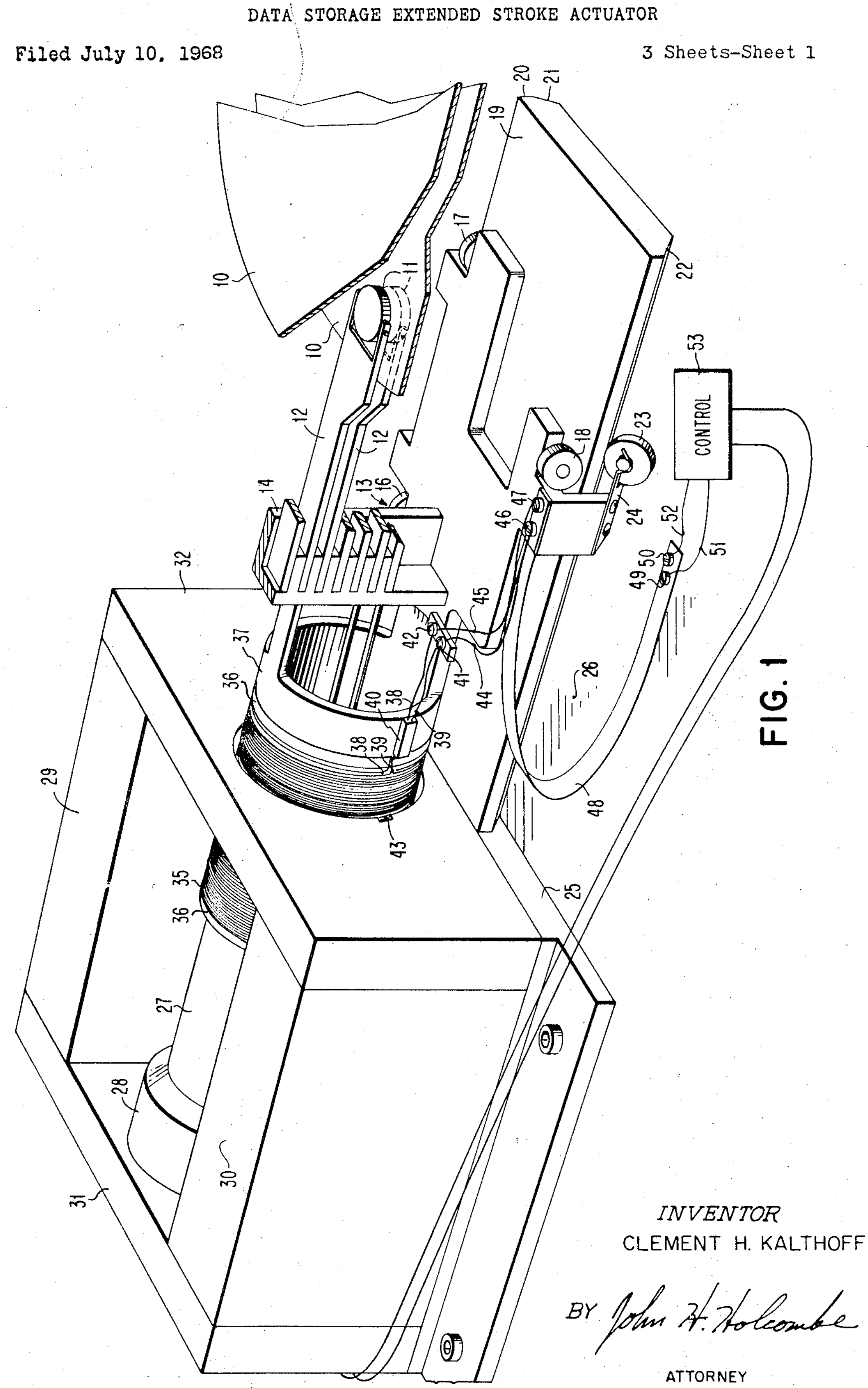
FIG. 1 is a perspective illustration of a linear electric motor in an actuator and transducer assembly, the motor incorporating the extended stroke means of the present invention.
Figure 2:
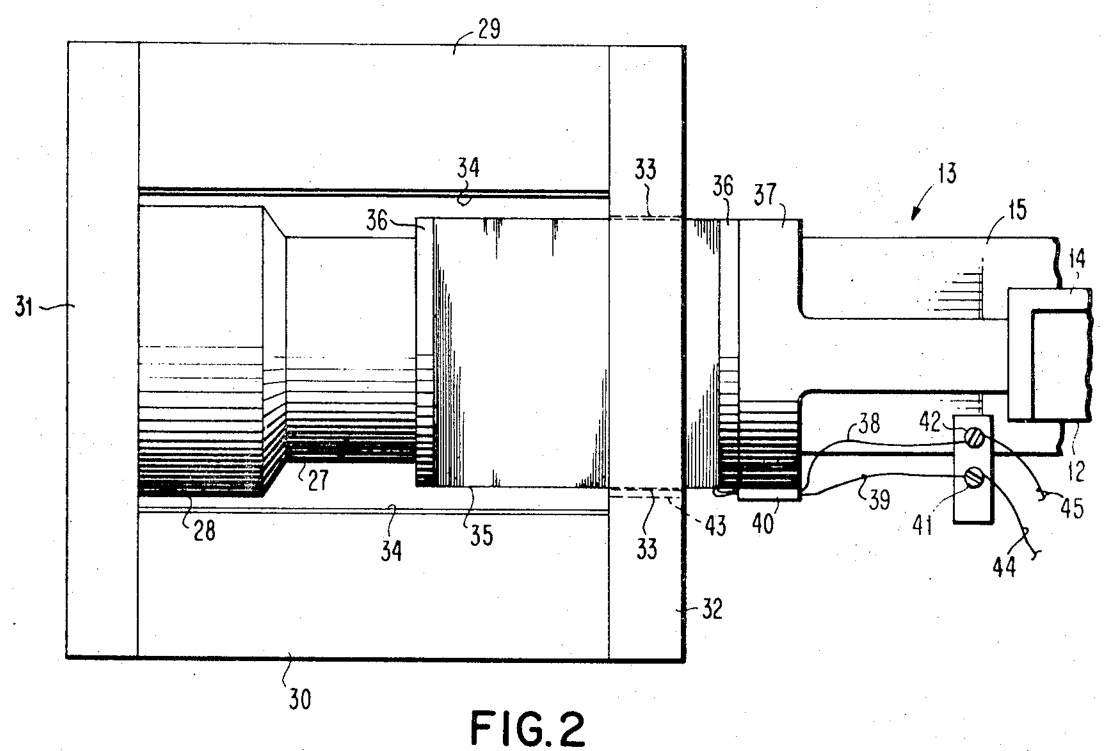
FIG. 2 is a plan view of the motor of FIG. 1.
Figure 3:
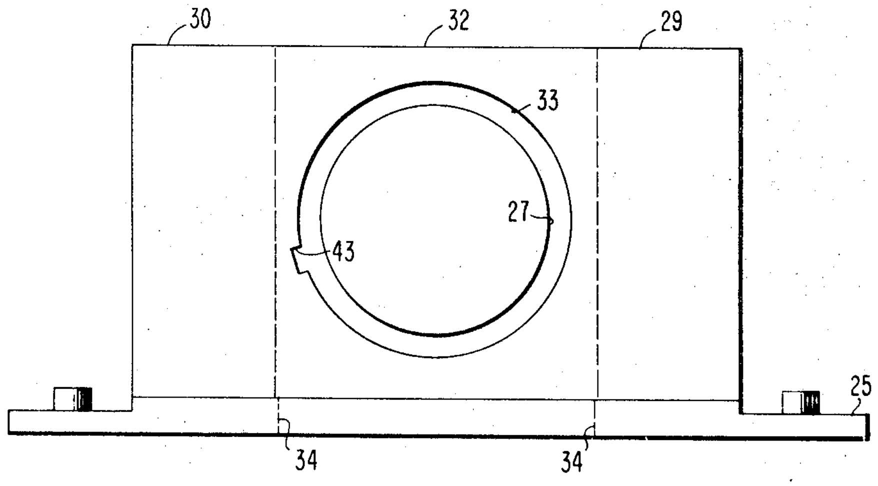
FIG. 3 is a frontal view of the magnet structure of the motor of FIG. 1.

An example of a linear electric motor employed with a data storage device is shown in FIGS. 1–3. The storage medium of FIG. 1 is a disk file, comprising a plurality of flat, circular disks 10 having a magnetizable coating on each surface. Data may be stored or played back therefrom by means of transducers 11. The transducers cooperate with the magnetizable surface to convert electrical energy into a magnetic field which permeates the magnetizable surface to thereby record thereon, or to detect the magnetic fields emanating from previously recorded data and convert the detected magnetic fields into electrical signals. The transducers are mounted on arm assemblies 12 which, in turn, are mounted on a carriage assembly 13.

The carriage assembly 13 includes a vertical portion 14 which is shown partially cutaway. The vertical portion supports a plurality of the arm assemblies and transducers, only two of which are shown in their entirety. In a more common arrangement presently in use, either ten transducer and arm assemblies cooperate with five disks or twenty transducer and arm assemblies cooperate with ten disks.

The vertical portion 14 of the carriage assembly is fixedly mounted with respect to a base portion 15 of the carriage. The base portion 15 has three precision rollers 16–18, rotatably attached thereto. The rollers bear on a surface 19 of a baseplate 20. The surface 19 is precisely positioned with respect to the vertical location of the disks 10 and is maintained exactly parallel to the disks. Hence, the precise structure of the carriage assembly 13 and baseplate 20 assures that the transducers 11 will be precisely oriented with respect to the surfaces of the disks 10.

The rollers 16–18 are held against the surface 19 of baseplate 20 by means of spring-loaded rollers which ride on tapered surfaces 21 and 22 of the baseplate. A roller 23 is held against the tapered surface 22 by means of a spring 24 attached to the carriage assembly 13. The spring is adjusted so as to be maintained slightly deformed to thereby force the roller 23 into engagement with the tapered surface 22. A similar roller and spring arrangement is provided on the opposite side of the carriage assembly 13 to engage tapered surface 21 of the baseplate 20. The pressures exerted by these rollers force the rollers 16–18 into engagement with the surface 19 of the baseplate 20 and thereby maintain the precise alignment described.

The magnet structure of the present invention is fixedly mounted with respect to baseplate 20 and hence held in alignment therewith. A base 25 for the magnet structure is included which merely supports the magnet structure in a fixed relationship. The baseplate 20 for the carriage assembly 13 and the support 25 for the magnet structure are both supported by a common member 26.

The magnet structure of the linear electric motor includes a pole piece 27 made of magnetically permeable material, such as soft iron. In the example shown, the pole piece 27 is centrally located and is in the form of a cylinder having a base 28 of slightly larger diameter. The larger diameter is merely to increase the overall permeability of the central pole piece and is not necessary for operation.

Two permanent magnets 29 and 30 are arranged generally in parallel to the axis of cylindrical pole piece 27. The polarities of the two permanent magnets are the same. The south pole of each of the permanent magnets is connected to the base 28 of the cylindrical pole piece 27 by means of a rear pole piece 31. The rear pole piece is constructed of magnetically permeable material, such as soft iron.

The north polarity ends of the permanent magnets 29 and 30 are interconnected by means of a front pole piece 32. The front pole piece is also constructed of magnetically permeable material, usch as soft iron. A hole 33 is cut in the central pole piece of radius larger than the radius of central pole piece 27, thereby allowing the central pole piece to extend therethrough. The axes of the hole 33 and of the central pole piece 27 are aligned to form a substantially uniform gap therebetween.

The magnet structure is assembled by placing the pieces together, as shown, on base 25, aligning the cylindrical center pole piece 27 with respect to hole 33 and front pole piece 32, and fixedly mounting the assembly to baseplate 25.

Figure 4:
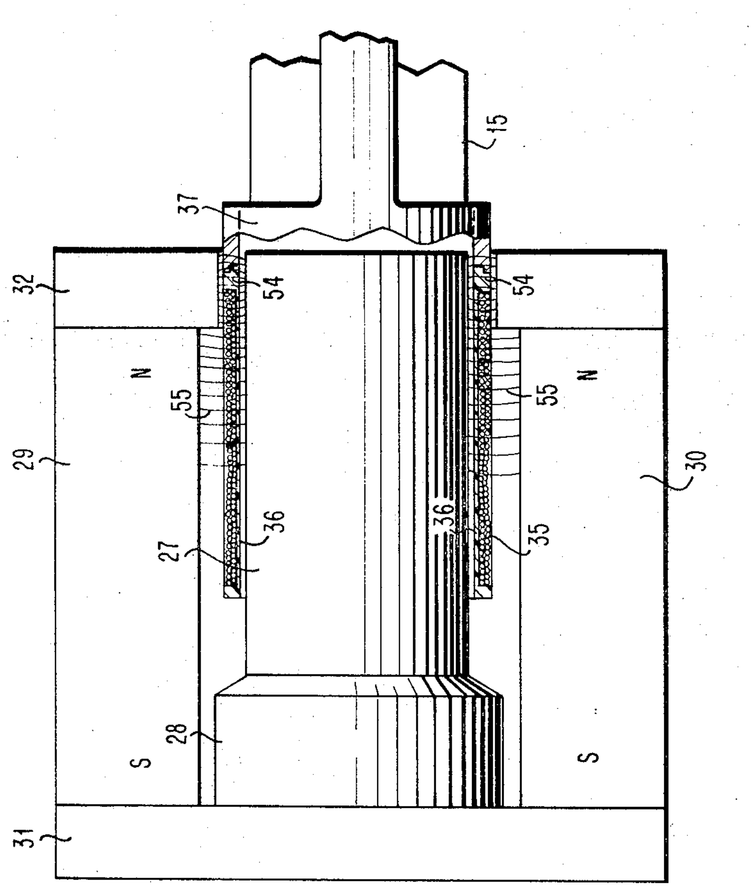
FIG. 4 is a cutaway plan view of the motor of FIG. 1 shown with the coil partially retracted.

Referring additionally to FIG. 4, an electric coil 35 is wound on a bobbin 36 in a nearly uniform manner over the length of the bobbin. The bobbin is of tubular shape, having an interior diameter slightly greater than that of cylindrical pole piece 27. The bobbin is thus adapted to fit over this cylindrical pole piece and, when actually aligned therewith, to be out of contact with the pole piece. Likewise, the outer diameter of bobbin 36 and the thickness of the winding coil 35 are arranged to provide an overall outside diameter slightly less than the inner diameter of hole 33. Therefore, when actually aligned therewith, no frictional contact occurs therebetween.

The bobbin 36 in the example shown is constructed from a non-magnetic material. Increased inefficiency of operation will result if the material is also non-conducting, such as phenolic resin. The bobbin 36 is aligned with and fixedly attached to coil extension 37. As will be discussed hereinafter, the coil extension comprises a ring made from a non-magnetic and a conducting material such as aluminum. The coil extension 37 is fixedly mounted with respect to carriage assembly 13. In the example shown, the bobbin 36 is aligned with coil extension 37, and the coil extension is aligned with and is fixedly attached to vertical portion 14 and base portion 15 of the carriage assembly 13. As discussed above, the support plate 25 for the magnet assembly is placed on support surface 26 so that the assembly is accurately aligned with respect to the carriage baseplate 20. The magnet assembly is then firmly mounted in place.

As a result, subsequent mounting of the carriage assembly 13 on carriage base 20 establishes accurate alignment of bobbin 36 and coil extension 37 with respect to the axes of both cylindrical pole piece 27 and hole 33 of pole piece 32. The bobbin 36 with coil 35 and coil extension 37 thus may move with mechanical freedom through the gap formed between the cylindrical pole piece 27 and the hole 33 of pole piece 32.

The wires 38, 39 comprising either end of coil 35 are routed through an insulator 40 to terminals 41, 42. The insulator 40 is fixedly attached to the outer surface of coil extension 37. A small notch 43 is cut in the front pole piece 32 to allow the insulator 40 to clear the front pole piece. This notch does not significantly affect the magnetic field in the gap.

Wires 44, 45 connect respectively terminals 41, 42 to terminals 46, 47. A flexible cable 48 comprising two conductors connects the terminals 46, 47 on carriage assembly 13 to, respectively, terminals 49, 50 which are fixedly attached to stationary support member 26. The flexible cable 48 is adapted to flex in accordance with any movement of the carriage assembly 13 with complete freedom. The terminals 49, 50 are connected by wires 51, 52 to a control source 53. The control source produces electrical energy which is transmitted over the named wires to provide a current in the coil 35 to control the operation of the described linear electric motor.

The primary magnetic fields emanated by the permanent magnets 29, 30 extend from the south pole thereof, through the rear pole piece 31, and into the center pole piece 27. The fields then extend from the center piece 27 radially into the gap between the pole piece and the front pole piece 32. The fields close themselves through the front pole piece 32 to the north pole of each of the magnets.

The resultant primary magnetic field 54 extends radially across the gap between the center pole piece 27 and the front pole piece 32, and thus intersects the portion of the coil 35 in the gap in a perpendicular direction. Therefore, energization of the coil by means of a current from control 53 via the described connections interacts with the magnetic field in the gap to produce a substantial force acting on the coil in the axial direction. Whether the force is directed toward or away from the center of the disks 10 depends upon the direction of the current flow through the coil 35.

This force drives the carriage assembly 13 in the direction of the force as guided by the carriage baseplate 20.

Control 53 operates in accordance with known servo principles to move the array of heads 11 from one set of vertically spaced tracks to another set. A set of vertically spaced tracks having the same radius and being vertically aligned constitutes a "cylinder". Hence, accessing by the linear electric motor described constitutes moving the array of heads 11 from cylinder to cylinder.

The total length of coil 35 is approximately equal to the sum of width of the non-magnetic gap, which is the thickness of front pole piece 32, plus the total distance between the innermost and outermost cylinders of the diks 10. Therefore, a portion of the coil 35 completely fills the width of the non-magnetic gap when the transducers 11 lie within any of the cylinders of disk 10. Current supplied the coil 35 by control 53 therefore coacts with maximum efficiency with the primary magnetic flux 54 within the gap to thereby allow high speed accessing from cylinder to cylinder.

The arrangement of the winding of coil 35 may be made so that a constant force is generated for a constant current supply to the coil regardless of the axial position of the coil. The method of designing such a coil is explained in IBM Technical Disclosure Bulletin, Vol. 7, No. 7, pp. 640–1, December 1964 entitled "Varied Pitch, Force Compensating Voice Coil," by C. H. Kalthoff.

Referring primarily to FIG. 4, the non-magnetic and non-conducting bobbin 36 is shown fixedly attached to coil extension 37. The coil extension is of tubular shape having an inner diameter corresponding to that of bobbin 36 and having an outer diameter corresponding to that of coil 35. The coil extension and the bobbin are joined so as to be in axial alignment so that the coil extension may likewise be moved into the gap formed between center pole piece 27 and the inner face 33 of front pole piece 32. The coil extension 37 is attached to carriage assembly 13 as described above so that it and bobbin 36 are in proper alignment with the gap.

The apparatus of FIG. 4 is shown in the midst of a retraction stroke. Therefore, the coil extension 37 is drawn part way into the gap, displacing coil 35. As the result, the current in coil 35 coacts with only a portion of the primary lines of flux 54 extending across the gap. The amount of force created by that coaction is therefore substantially reduced from that created when the coil extends entirely through the gap during accessing. The retraction, however, is done only on those occasions when a disk pack including disks 10 is to be removed or when the system is to be shut down. The speed of this retraction is unimportant with respect to the efficiency of the operating system. Speed is only important during the accessing operation. Hence, the reduced force available for retraction is perfectly acceptable.

When the assembly is in the approximate position shown in FIG. 4, the current in coil 35 is reversed to slow the speed of retraction of the assembly. The current in the coil 35 coacts not only with the primary magnetic field 54, which coaction is being continually reduced as the coil is displaced from the gap by coil extension 37, but also coacts with leakage flux 55. The force generated on the coil by this coaction will stop the coil upon completion of the retraction. When the assembly stops, the control 53 in FIG. 1 ceases supplying current to the coil so that the assembly will remain stopped in the retracted position.

The leakage flux 55 referred to above is that extending from magnets 29 and 30 and from front pole piece 32 to center pole piece 27 outside the gap. Since the non-magnetic space through which the leakage lines of flux extend is significantly longer than that of the flux gap through which the primary lines of flux 54 extend, the leakage flux comprises a significantly weaker magnetic field. Therefore, the coaction between the current in coil 35 and the leakage flux 55 produces a significantly lower force than when coacting with primary magnetic flux 54. The force generated is however sufficient for retracting the transducer from the disk pack and for insertion of the transducer into the disk pack. The performance required for the retraction and insertion of the transducers is significantly less than that required for accessing the transducers between cylinders.

After the assembly is fully retracted and stopped, the disk pack may be changed at any time. At this time, the coil 35 lies entirely outside the primary magnetic flux 54 and subsequent current supplied thereto may coact only with the leakage flux 55. However, the force generated thereby is sufficient to move the transducers 11 of FIG. 1 toward the disks 10. As the coil moves forward, the leading turns thereof move into the gap between center pole piece 27 and front pole piece 32. The current in these turns thus coacts with the primary magnetic flux 54. Hence, the force acting on the coil increases so as to increase the acceleration of the assembly. The acceleration continues until coil extension 37 is moved entirely out of the gap so that the full width of the gap is occupied by the coil 35. Then, control 53 reverses the current in the coil causing the assembly to decelerate and stop the transducers 11 at a predetermined cylinder.

Referring again to FIG. 4, it was stated above that the control 53 of FIG. 1 reverses the current in coil 35 during the retraction stroke when the assembly is approximately in the position shown in FIG. 4. However, power may fail at some time during the retraction stroke so that no braking current would be supplied. This is called an uncontrolled retraction. Without the coil extension 37 of the subject invention, the assembly would continue retracting until stopped either by an emergency braking means of some type or until crashing at the limit of motion.

However, the coil extension 37 is made of an electrically conductive material. This material may comprise the entirety of the coil extension or may comprise a layer of material on the support or may comprise a ring at one end of the coil support. In the example shown, the entire coil support is made of electrically conductive aluminum.

As the electrically conductive material enters the primary magnetic field 54, the field generates an eddy current therein. The conductive coil support comprises a closed ring around the center pole piece 27. This ring is made of conductive material, hence, the impedance presented the induced eddy current is low. The amplitude of this eddy current is directly proportional to the velocity of the coil extension in the magnetic field.

The eddy current thus induced coacts with the magnetic field to create a force acting on the coil extension opposite to the direction of movement of the assembly. This force therefore tends to brake or slow the velocity of the assembly. In this manner, the coil extension 37 acts as an emergency braking means substantially slowing the velocity of an uncontrolled retraction of the assembly to prevent damage to the assembly from such a retraction.

The invention has been shown with respect to a specific linear electric motor, but may be employed in any electric motor having a similar moving coil arrangement.

While the invention has been particularly shown and described with reference to a preferred embodiment thereof, it will be understood by those skilled in the art that various changes in form and details may be made therein without from departing from the spirit and scope of the invention.

What is claimed is:

1. In a motor which converts electrical energy into linear mechanical motion, said motor including a first pole terminating in an extended portion, a second pole terminating in an extended portion, a second pole terminating in an opening substantially surrounding part of said extended portion to form a non-magnetic gap therebetween, magnet means to generate a magnetic field, the lines of flux of which are directed by said poles to extend primarily across said gap with some leakage flux extending between said poles outside said gap, and an electric drive coil arranged to substantially conform to and be freely movable through said non-magnetic gap, the improvement thereto comprising:

a lightweight non-magnetic coil extension element attached to one end of said coil, said element likewise substantially conforming to said non-magnetic gap, thereby allowing the movement of said element into said non-magnetic gap and of said coil entirely out of said non-magnetic gap, whereat an electric current through said coil coacts only with said leakage flux to generate a force on said coil tending to move said coil along said gap; and a shorted turn of electrically conductive material forming at least a part of said non-magnetic coil extension element to provide an induced eddy current therein in response to movement of said element into said non-magnetic gap, which eddy current coacts with said primary magnetic flux to generate a force on said non-magnetic element tending to slow the velocity of said non-magnetic element.

2. The motor of claim 1 wherein:

said terminal portion of said first pole is substantially cylindrical shape having an axis, said opening of said second pole having a cylindrical surface with an axis substantially co-extensive with said axis of said terminal portion of said first pole, said electric drive coil is in the shape of a hollow cylinder to conform to said non-magnetic gap, and said non-magnetic coil extension element comprises a closed circular loop of electrically conductive material entirely within the inner and outer radii defined by said hollow cylindrical shape of said drive coil, thereby comprising said shorted turn.

3. The motor of claim 2 additionally including:

carriage means arranged to be movable along a predetermined path, said predetermined path being aligned in one plane with respect to said axis of said terminal portion of said first pole, said carriage means being attached to said non-magnetic coil extension element in a manner to support said electric coil within said gap so that the axis of said hollow cylindrical drive coil is approximately coextensive with said axis of said terminal portion of said first pole.

4. The motor of claim 3 adapted to be employed to move a transducer laterally with respect to tracks of a magnetic disk and to retract the transducer outside the cylinder formed by the disk, wherein:

said magnetic transducer is mounted from said carriage means and moved linearly thereby; and said non-magnetic coil extension element moves into said non-magnetic gap only upon said retraction of said transducer.

References Cited

UNITED STATES PATENTS

| | | | |
|---|---|---|---|
| 2,750,961 | 6/1956 | Uritis | 310—27 XR |
| 3,300,744 | 1/1967 | Deutsch | 310—14 XR |
| 3,176,170 | 3/1965 | Fulton et al. | 310—12 |
| 2,781,461 | 2/1957 | Booth et al. | 310—27 |
| 2,810,842 | 10/1957 | Lewis | 310—27 |
| 2,590,554 | 3/1952 | Lukacs | 179—115.5 XR |
| 2,774,895 | 12/1956 | Zuckermann | 310—105 |
| 3,085,847 | 4/1963 | Massa | 310—27 XR |
| 3,260,870 | 7/1966 | Beach et al. | 310—14 |
| 3,130,331 | 4/1964 | Jallen et al. | 310—14 |

MILTON O. HIRSHFIELD, Primary Examiner

B. A. REYNOLDS, Assistant Examiner

U.S. Cl. X.R.

310—27

PO-1050
(5/69)

UNITED STATES PATENT OFFICE
CERTIFICATE OF CORRECTION

Patent No. 3,521,092 Dated July 21, 1970

Inventor(s) Clement H. Kalthoff

It is certified that error appears in the above-identified patent and that said Letters Patent are hereby corrected as shown below:

In Col. 7, beginning at line 23 and continuing on line 24, the words "a second pole terminating in an extended portion," should be deleted.

SIGNED AND
SEALED
OCT 20 1970

(SEAL)
Attest:

Edward M. Fletcher, Jr.
Attesting Officer

WILLIAM E. SCHUYLER, JR.
Commissioner of Patents